(12) United States Patent
Cronin

(10) Patent No.: US 11,064,050 B2
(45) Date of Patent: *Jul. 13, 2021

(54) CROWD AND CLOUD ENABLED VIRTUAL REALITY DISTRIBUTED LOCATION NETWORK

(71) Applicant: SONY INTERACTIVE ENTERTAINMENT LLC, San Mateo, CA (US)

(72) Inventor: John Cronin, Williston, VT (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/445,008

(22) Filed: Jun. 18, 2019

(65) Prior Publication Data

US 2019/0306276 A1 Oct. 3, 2019

Related U.S. Application Data

(63) Continuation of application No. 14/460,275, filed on Aug. 14, 2014, now Pat. No. 10,356,215, which is a
(Continued)

(51) Int. Cl.
*G06F 16/44* (2019.01)
*G06F 16/954* (2019.01)
(Continued)

(52) U.S. Cl.
CPC .......... *H04L 67/38* (2013.01); *G06F 3/04815* (2013.01); *G06F 16/444* (2019.01);
(Continued)

(58) Field of Classification Search
CPC .. G06F 3/04815; G06F 16/444; G06F 16/954; H04L 67/38
See application file for complete search history.

(56) References Cited

U.S. PATENT DOCUMENTS

| 3,883,237 A | 5/1975 | Juergens |
| 5,258,785 A | 11/1993 | Dawkins |

(Continued)

FOREIGN PATENT DOCUMENTS

| CN | 101 098 491 A | 1/2008 |
| CN | 102 566 756 A | 7/2012 |

(Continued)

OTHER PUBLICATIONS

U.S. Appl. No. 14/460,272, John Cronin, Personal Digital Assistance and Virtual Reality, filed Aug. 14, 2014.

(Continued)

*Primary Examiner* — Aaron N Strange
(74) *Attorney, Agent, or Firm* — Polsinelli LLP

(57) ABSTRACT

A virtual reality network provides access to a number of virtual reality representations, each virtual reality representation representing a location in a virtual universe and defined by VR data stored on the network. The VR data can be in a simplified data format. A database stores the network address and the location in the universe of each virtual reality representation. A database server provides access to the database. The database server generates a list of locations in response to a location query from a visitor, and provides the network address of the virtual reality representation of a selected location. A visitor connects to the database server with a client host to visit the locations in the virtual universe.

19 Claims, 8 Drawing Sheets

Related U.S. Application Data continuation of application No. 14/147,431, filed on Jan. 3, 2014, now abandoned.

(60) Provisional application No. 61/786,581, filed on Mar. 15, 2013.

(51) Int. Cl.
  *G06F 3/0481* (2013.01)
  *H04L 29/06* (2006.01)
  *H04L 29/08* (2006.01)

(52) U.S. Cl.
  CPC ............ *G06F 16/954* (2019.01); *H04L 67/22* (2013.01); *H04L 67/42* (2013.01)

(56) References Cited

U.S. PATENT DOCUMENTS

| | | | |
|---|---|---|---|
| 5,585,871 A | 12/1996 | Linden | |
| 5,757,358 A | 5/1998 | Osga | |
| 5,982,555 A | 11/1999 | Melville et al. | |
| 6,084,979 A | 7/2000 | Kanade et al. | |
| 6,151,060 A | 11/2000 | Tabata | |
| 6,152,563 A | 11/2000 | Hutchinson et al. | |
| 6,175,352 B1 | 1/2001 | Kay et al. | |
| 6,184,847 B1 | 2/2001 | Fateh et al. | |
| 6,282,362 B1 | 8/2001 | Murphy et al. | |
| 6,315,273 B1 | 11/2001 | Davies | |
| 6,345,129 B1 | 2/2002 | Aharon | |
| 6,415,316 B1* | 7/2002 | Van Der Meer | G06Q 10/109 709/203 |
| 7,298,378 B1* | 11/2007 | Hagenbuch | G06F 16/444 345/589 |
| 7,667,700 B1 | 2/2010 | Neely et al. | |
| 7,933,395 B1 | 4/2011 | Bailly et al. | |
| 7,949,642 B2 | 5/2011 | Yang et al. | |
| 7,970,240 B1 | 6/2011 | Chao et al. | |
| 8,583,915 B1 | 11/2013 | Huang | |
| 8,803,912 B1 | 8/2014 | Fouts | |
| 9,007,301 B1 | 4/2015 | Raffle et al. | |
| 9,043,325 B1 | 5/2015 | Moczydlowski | |
| 9,096,920 B1 | 8/2015 | Gomez et al. | |
| 9,213,185 B1 | 12/2015 | Stamer et al. | |
| 9,240,014 B1 | 1/2016 | Hoffman et al. | |
| 9,254,438 B2 | 2/2016 | Finn et al. | |
| 9,256,347 B2 | 2/2016 | Finn et al. | |
| 9,261,959 B1 | 2/2016 | D'Amico et al. | |
| 9,318,026 B2 | 4/2016 | Peters et al. | |
| 9,329,682 B2 | 5/2016 | Keane et al. | |
| 9,437,159 B2 | 9/2016 | Moravetz | |
| 9,472,014 B2 | 10/2016 | Chan et al. | |
| 9,521,368 B1 | 12/2016 | Cronin | |
| 9,555,334 B2 | 1/2017 | Bernard et al. | |
| 9,588,343 B2 | 3/2017 | Cronin | |
| 9,669,296 B1 | 6/2017 | Hibbert et al. | |
| 9,710,873 B1 | 7/2017 | Hill | |
| 9,818,230 B2 | 11/2017 | Moravetz | |
| 9,838,506 B1 | 12/2017 | Cronin | |
| 9,986,207 B2 | 5/2018 | Cronin | |
| 10,096,167 B2 | 10/2018 | Moravetz | |
| 10,216,738 B1 | 2/2019 | Cronin | |
| 10,320,946 B2 | 6/2019 | Cronin | |
| 10,356,215 B1 | 7/2019 | Cronin | |
| 10,401,958 B2 | 9/2019 | Peana et al. | |
| 10,474,711 B1 | 11/2019 | Cronin | |
| 10,565,249 B1 | 2/2020 | Cronin | |
| 10,599,707 B1 | 3/2020 | Cronin | |
| 10,809,798 B2 | 10/2020 | Moravetz | |
| 10,938,958 B2 | 3/2021 | Cronin | |
| 10,949,054 B1 | 3/2021 | Cronin | |
| 2002/0038456 A1 | 3/2002 | Hansen et al. | |
| 2002/0083134 A1* | 6/2002 | Bauer, Jr. | G06F 16/954 709/204 |
| 2004/0111332 A1 | 6/2004 | Baar et al. | |
| 2004/0193441 A1 | 9/2004 | Altieri | |
| 2005/0086612 A1 | 4/2005 | Gettman et al. | |
| 2006/0026170 A1* | 2/2006 | Kreitler | G06F 16/9537 |
| 2006/0028400 A1 | 2/2006 | Lapstun et al. | |
| 2006/0236240 A1 | 10/2006 | Lebow | |
| 2006/0242680 A1 | 10/2006 | Johnson et al. | |
| 2007/0296646 A1 | 12/2007 | Yamamoto et al. | |
| 2008/0024392 A1 | 1/2008 | Gustafsson et al. | |
| 2008/0106489 A1 | 5/2008 | Brown et al. | |
| 2008/0155019 A1* | 6/2008 | Wallace | A63F 13/12 709/204 |
| 2008/0221843 A1 | 9/2008 | Shenkar et al. | |
| 2008/0306817 A1 | 12/2008 | Amidon et al. | |
| 2009/0005961 A1 | 1/2009 | Grabowski et al. | |
| 2009/0106672 A1 | 4/2009 | Burstrom | |
| 2009/0112469 A1 | 4/2009 | Lapidot et al. | |
| 2009/0113349 A1 | 4/2009 | Zohar et al. | |
| 2009/0263777 A1 | 10/2009 | Kohn | |
| 2009/0271436 A1 | 10/2009 | Reisinger | |
| 2010/0017728 A1 | 1/2010 | Cho et al. | |
| 2010/0026718 A1 | 2/2010 | Jetha et al. | |
| 2010/0083169 A1 | 4/2010 | Athsani et al. | |
| 2010/0088632 A1 | 4/2010 | Knowles et al. | |
| 2010/0102476 A1 | 4/2010 | Higgins | |
| 2010/0110069 A1 | 5/2010 | Yuan | |
| 2010/0208029 A1 | 8/2010 | Marti et al. | |
| 2010/0231706 A1 | 9/2010 | Maguire | |
| 2010/0238161 A1 | 9/2010 | Varga et al. | |
| 2010/0259471 A1 | 10/2010 | Takano et al. | |
| 2010/0262933 A1 | 10/2010 | Kim et al. | |
| 2011/0043530 A1 | 2/2011 | Nozuki | |
| 2011/0055727 A1 | 3/2011 | Dawson et al. | |
| 2011/0087350 A1 | 4/2011 | Fogel et al. | |
| 2011/0214071 A1 | 9/2011 | Zyda et al. | |
| 2011/0219291 A1 | 9/2011 | Lisa | |
| 2011/0267419 A1 | 11/2011 | Quinn et al. | |
| 2011/0301760 A1 | 12/2011 | Shuster et al. | |
| 2011/0313779 A1 | 12/2011 | Herzog et al. | |
| 2012/0050257 A1 | 3/2012 | Clarke | |
| 2012/0059941 A1* | 3/2012 | Cabasse | G06Q 10/10 709/227 |
| 2012/0086727 A1 | 4/2012 | Korah et al. | |
| 2012/0105326 A1 | 5/2012 | Jeong et al. | |
| 2012/0113092 A1 | 5/2012 | Bar-zeev et al. | |
| 2012/0120498 A1 | 5/2012 | Harrison et al. | |
| 2012/0127062 A1 | 5/2012 | Bar-zeev et al. | |
| 2012/0154277 A1 | 6/2012 | Bar-zeev et al. | |
| 2012/0154557 A1 | 6/2012 | Perez et al. | |
| 2012/0188148 A1 | 7/2012 | DeJong | |
| 2012/0194418 A1 | 8/2012 | Osterhout et al. | |
| 2012/0194552 A1 | 8/2012 | Osterhout et al. | |
| 2012/0249741 A1 | 10/2012 | Maciocci et al. | |
| 2012/0289147 A1 | 11/2012 | Raleigh et al. | |
| 2012/0311043 A1 | 12/2012 | Chen et al. | |
| 2013/0007668 A1 | 1/2013 | Liu et al. | |
| 2013/0021373 A1 | 1/2013 | Vaught et al. | |
| 2013/0057550 A1 | 3/2013 | Kishikawa et al. | |
| 2013/0069787 A1 | 3/2013 | Petrou | |
| 2013/0083009 A1 | 4/2013 | Geisner et al. | |
| 2013/0083063 A1 | 4/2013 | Geisner et al. | |
| 2013/0106674 A1 | 5/2013 | Wheeler et al. | |
| 2013/0117707 A1 | 5/2013 | Wheeler et al. | |
| 2013/0120224 A1 | 5/2013 | Cajigas et al. | |
| 2013/0125066 A1 | 5/2013 | Klein et al. | |
| 2013/0182891 A1 | 7/2013 | Ling | |
| 2013/0191178 A1 | 7/2013 | Thompson et al. | |
| 2013/0194389 A1 | 8/2013 | Vaught et al. | |
| 2013/0226528 A1 | 8/2013 | Hodgins et al. | |
| 2013/0227017 A1 | 8/2013 | Gahlings | |
| 2013/0241805 A1 | 9/2013 | Gomez | |
| 2013/0246967 A1 | 9/2013 | Wheeler et al. | |
| 2013/0263016 A1 | 10/2013 | Lehtiniemi et al. | |
| 2013/0278531 A1 | 10/2013 | Pisaris-Henderson | |
| 2013/0293468 A1 | 11/2013 | Perez et al. | |
| 2013/0321265 A1 | 12/2013 | Bychkov et al. | |
| 2013/0335301 A1 | 12/2013 | Wong et al. | |
| 2013/0335303 A1 | 12/2013 | Maciocci et al. | |
| 2013/0335447 A1 | 12/2013 | Lu et al. | |
| 2013/0336629 A1 | 12/2013 | Mulholland et al. | |
| 2014/0063054 A1 | 3/2014 | Osterhout et al. | |

(56) References Cited

U.S. PATENT DOCUMENTS

| | | |
|---|---|---|
| 2014/0063055 A1 | 3/2014 | Osterhout et al. |
| 2014/0101608 A1 | 4/2014 | Ryskamp et al. |
| 2014/0111427 A1 | 4/2014 | Lindley et al. |
| 2014/0164921 A1 | 6/2014 | Salinas |
| 2014/0172906 A1* | 6/2014 | Sud .................. G06F 16/58 707/769 |
| 2014/0229850 A1 | 8/2014 | Makofsky et al. |
| 2014/0267581 A1 | 9/2014 | Cronin |
| 2014/0280502 A1 | 9/2014 | Cronin |
| 2014/0280503 A1 | 9/2014 | Cronin |
| 2014/0280504 A1 | 9/2014 | Cronin |
| 2014/0280505 A1 | 9/2014 | Cronin |
| 2014/0280506 A1 | 9/2014 | Cronin |
| 2014/0280644 A1 | 9/2014 | Cronin |
| 2014/0282113 A1 | 9/2014 | Cronin |
| 2014/0310643 A1* | 10/2014 | Karmanenko .......... G06F 1/165 715/784 |
| 2015/0007114 A1 | 1/2015 | Poulos et al. |
| 2015/0009132 A1 | 1/2015 | Kuriya et al. |
| 2015/0062114 A1 | 3/2015 | Ofstad |
| 2015/0123997 A1 | 5/2015 | Hayasaka et al. |
| 2015/0212322 A1 | 7/2015 | Moravetz |
| 2015/0213778 A1 | 7/2015 | Moravetz |
| 2017/0004654 A1 | 1/2017 | Moravetz |
| 2017/0090460 A1 | 3/2017 | Andrew et al. |
| 2017/0150103 A1 | 5/2017 | Cronin |
| 2017/0242479 A1 | 8/2017 | Cronin |
| 2018/0082483 A1 | 3/2018 | Moravetz |
| 2018/0097915 A1 | 4/2018 | Cronin |
| 2019/0297172 A1 | 9/2019 | Cronin |
| 2020/0329123 A1 | 10/2020 | Cronin |
| 2020/0379556 A1 | 12/2020 | Moravetz |

FOREIGN PATENT DOCUMENTS

| | | |
|---|---|---|
| CN | 106 471 420 B | 4/2019 |
| EP | 1 679 577 | 7/2006 |
| EP | 2 378 781 | 10/2011 |
| JP | H10-222287 | 8/1998 |
| JP | H11-095971 | 4/1999 |
| JP | 2002-351592 | 12/2002 |
| JP | 2003-280805 | 10/2003 |
| JP | 2011-228859 | 11/2011 |
| JP | 2013-168910 | 8/2013 |
| JP | 2013-258614 | 12/2013 |
| JP | 2018-190429 | 11/2018 |
| JP | 2020-115352 | 7/2020 |
| KR | 10-2011-0094693 | 8/2011 |
| MX | 359047 | 9/2018 |
| RU | 111703 | 12/2011 |
| WO | WO 2013/138607 | 9/2013 |
| WO | WO 2015/112359 | 7/2015 |
| WO | WO 2015/112361 | 7/2015 |

OTHER PUBLICATIONS

U.S. Appl. No. 14/460,273, John Cronin, Real Time Unified Communications Interaction of a Predefined Location in a Virtual Reality Location, filed Aug. 14, 2014.
U.S. Appl. No. 14/460,276, John Cronin, System and Methods for Effective Virtual Reality Visitor Interface, filed Aug. 14, 2014.
U.S. Appl. No. 16/438,344, John Cronin, Virtual Reality Universe Representation Changes Viewing Based Upon Client Side Parameters, filed Jun. 11, 2019.
U.S. Appl. No. 14/460,280, John Cronin, Virtual Reality Enhanced Through Browser Connections, filed Aug. 14, 2014.
U.S. Appl. No. 14/460,272 Final Office Action dated Nov. 27, 2019.
U.S. Appl. No. 14/460,272 Final Office Action dated Feb. 22, 2018.
A Quality of Experience Model for Haptic Virtual Environments; Hamam et al., ACM Transaction on Multimedia Computing, Communications and Applications, vol. 10, No. 3, Article 28, pp. 1-23, Apr. 2014.
Hollerer, T., et al., "User interface management techniques for collaborative mobile augmented reality", Computers and Graphics, 25(5):799-810, Dec. 2001.
Chinese Patent Application 2015-80005815.1 First Office Action dated Oct. 30, 2017.
European Patent Application 15740676.0 Extended European Search Report dated Jul. 6, 2017.
Japanese Patent Application 2016-548227 Notification of Reason(s) for Refusal dated Jul. 18, 2017.
Japanese Patent Application 2018-108517 Non-Final Notification of Reason(s) for Refusal dated Apr. 16, 2019.
Russian Patent Application No. 2016134577 Office Action dated Aug. 18, 2017.
Russian Patent Application No. 2016134577 Search Report dated Aug. 18, 2017.
Chinese Patent Application No. 2015-80005727.1 Third Office Action dated Jun. 13, 2019.
Chinese Patent Application No. 2015-80005727.1 Search Report dated Jun. 13, 2019.
Chinese Patent Application No. 2015-80005727.1 Second Office Action dated Dec. 11, 2018.
Chinese Patent Application No. 2015-80005727.1 Search Report dated Dec. 11, 2018.
Japanese Patent Application No. 2016-546976 Final Notification of Reason(s) for Refusal dated Jan. 22, 2019.
Japanese Patent Application No. 2016-546976 Non-Final Notification of Reason(s) for Refusal dated Jul. 31, 2018.
Japanese Patent Application No. 2016-546976 Decision for Refusal dated Jul. 18, 2017.
Japanese Patent Application No. 2016-546976 Notification of Reason(s) for Refusal dated Feb. 7, 2017.
Russian Patent Application No. 2016134268 Office Action dated Oct. 18, 2017.
Russian Patent Application No. 2016134268 Search Report dated Sep. 25, 2017.
PCT Application No. PCT/US2015/010990 International Search Report and Written Opinion dated May 11, 2015.
PCT Application No. PCT/US2015/010994 International Search Report and Written Opinion dated May 1, 2015.
U.S. Appl. No. 14/283,082 Office Action dated Jul. 1, 2016.
U.S. Appl. No. 15/447,342 Final Office Action dated Sep. 5, 2019.
U.S. Appl. No. 15/447,342 Office Action dated Apr. 18, 2019.
U.S. Appl. No. 14/283,083 Office Action dated Sep. 30, 2015.
U.S. Appl. No. 15/239,382 Office Action dated Mar. 9, 2017.
U.S. Appl. No. 15/813,032 Office Action dated Jan. 24, 2018.
U.S. Appl. No. 14/460,272 Office Action dated Apr. 18, 2019.
U.S. Appl. No. 14/460,272 Office Action dated Jul. 5, 2017.
U.S. Appl. No. 14/460,272 Final Office Action dated Aug. 3, 2016.
U.S. Appl. No. 14/460,272 Office Action dated Jan. 14, 2016.
U.S. Appl. No. 14/460,273 Office Action dated May 15, 2019.
U.S. Appl. No. 14/460,273 Final Office Action dated Oct. 12, 2018.
U.S. Appl. No. 14/460,273 Office Action dated May 24, 2018.
U.S. Appl. No. 14/460,273 Final Office Action dated Nov. 2, 2017.
U.S. Appl. No. 14/460,273 Office Action dated May 10, 2017.
U.S. Appl. No. 14/460,275 Office Action dated Aug. 6, 2018.
U.S. Appl. No. 14/460,275 Final Office Action dated Nov. 8, 2017.
U.S. Appl. No. 14/460,275 Office Action dated Apr. 13, 2017.
U.S. Appl. No. 14/460,276 Final Office Action dated Oct. 15, 2018.
U.S. Appl. No. 14/460,276 Office Action dated May 8, 2018.
U.S. Appl. No. 14/460,276 Final Office Action dated Nov. 9, 2017.
U.S. Appl. No. 14/460,276 Office Action dated Apr. 13, 2017.
U.S. Appl. No. 14/460,277 Office Action dated Sep. 1, 2016.
U.S. Appl. No. 15/832,022 Office Action dated Sep. 7, 2018.
U.S. Appl. No. 14/460,279 Final Office Action dated Feb. 1, 2018.
U.S. Appl. No. 14/460,279 Office Action dated Jun. 15, 2017.
U.S. Appl. No. 14/460,280 Final Office Action dated Oct. 30, 2018.
U.S. Appl. No. 14/460,280 Office Action dated Jun. 14, 2018.
U.S. Appl. No. 14/460,280 Final Office Action dated Nov. 9, 2017.
U.S. Appl. No. 14/460,280 Office Action dated Apr. 18, 2017.
U.S. Appl. No. 14/460,281 Final Office Action dated Feb. 29, 2016.
U.S. Appl. No. 14/460,281 Office Action dated Oct. 8, 2015.
U.S. Appl. No. 15/377,288 Office Action dated Aug. 29, 2017.

(56) References Cited

OTHER PUBLICATIONS

Brazilian Patent Application No. BR1120160171810 Preliminary Office Action dated Apr. 28, 2020.
U.S. Appl. No. 16/792,793, John Cronin, Real Time Unified Communications Interaction of a Predefined Location in a Virtual Reality Location, filed Feb. 17, 2020.
U.S. Appl. No. 14/460,272 Office Action dated Jun. 2, 2020.
U.S. Appl. No. 15/447,342 Office Action dated Feb. 5, 2020.
U.S. Appl. No. 16/792,793 Final Office Action dated Jan. 19, 2021.
U.S. Appl. No. 16/792,793 Office Action dated Jul. 23, 2020.
U.S. Appl. No. 16/828,810 Final Office Action dated Jan. 21, 2021.
Chinese Patent Application 2015-80005815.1 Second Office Action dated May 31, 2018.
Indian Patent Application 201627025642 Examination Search Report dated Aug. 19, 2020.
Japanese Patent Application 2016-548227 Decision of Refusal dated Jan. 31, 2018.
Korean Patent Application 10-2016-7020346 Notice of Office Action dated Jun. 20, 2019.
Korean Patent Application 10-2020-7007152 Office Action dated Jun. 8, 2020.
Mexican Patent Application MX/a/2016/009682 Office Action dated Apr. 26, 2018.
PCT Application No. PCT/US2015/010990 International Preliminary Report on Patentability dated Jun. 26, 2016.
PCT Application No. PCT/US2015/010994 International Preliminary Report on Patentability dated Jul. 26, 2016.
U.S. Appl. No. 16/943,694 Office Action dated Sep. 16, 2020.
U.S. Appl. No. 16/828,810 Office Action dated Aug. 4, 2020.
Japanese Patent Application 2020-037787 Non-Final Notification of Reason(s) for Refusal dated Feb. 2, 2021.

\* cited by examiner

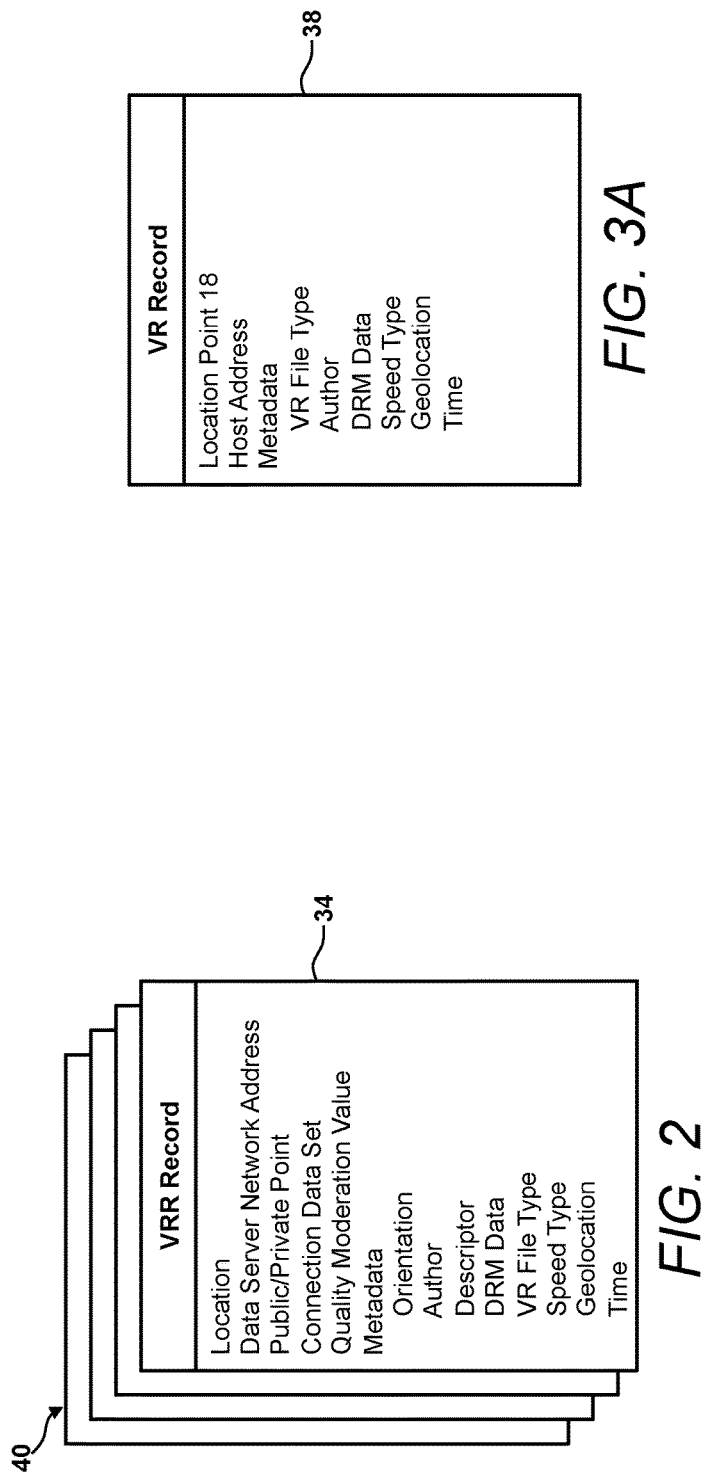
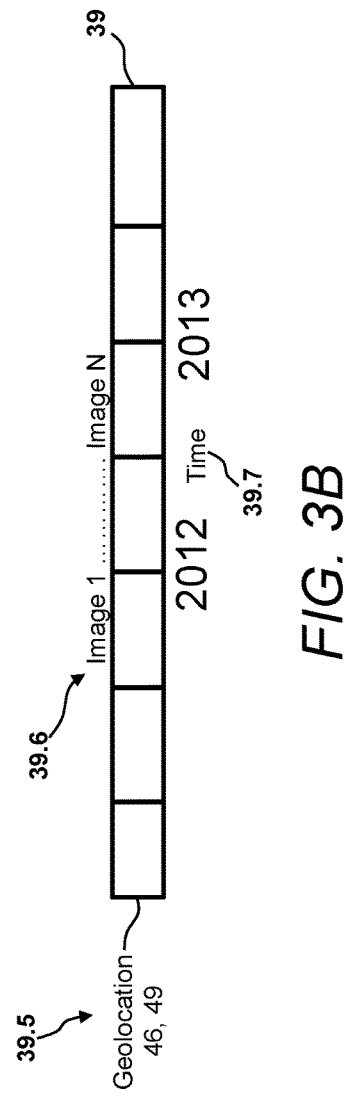
FIG. 2
FIG. 3A
FIG. 3B

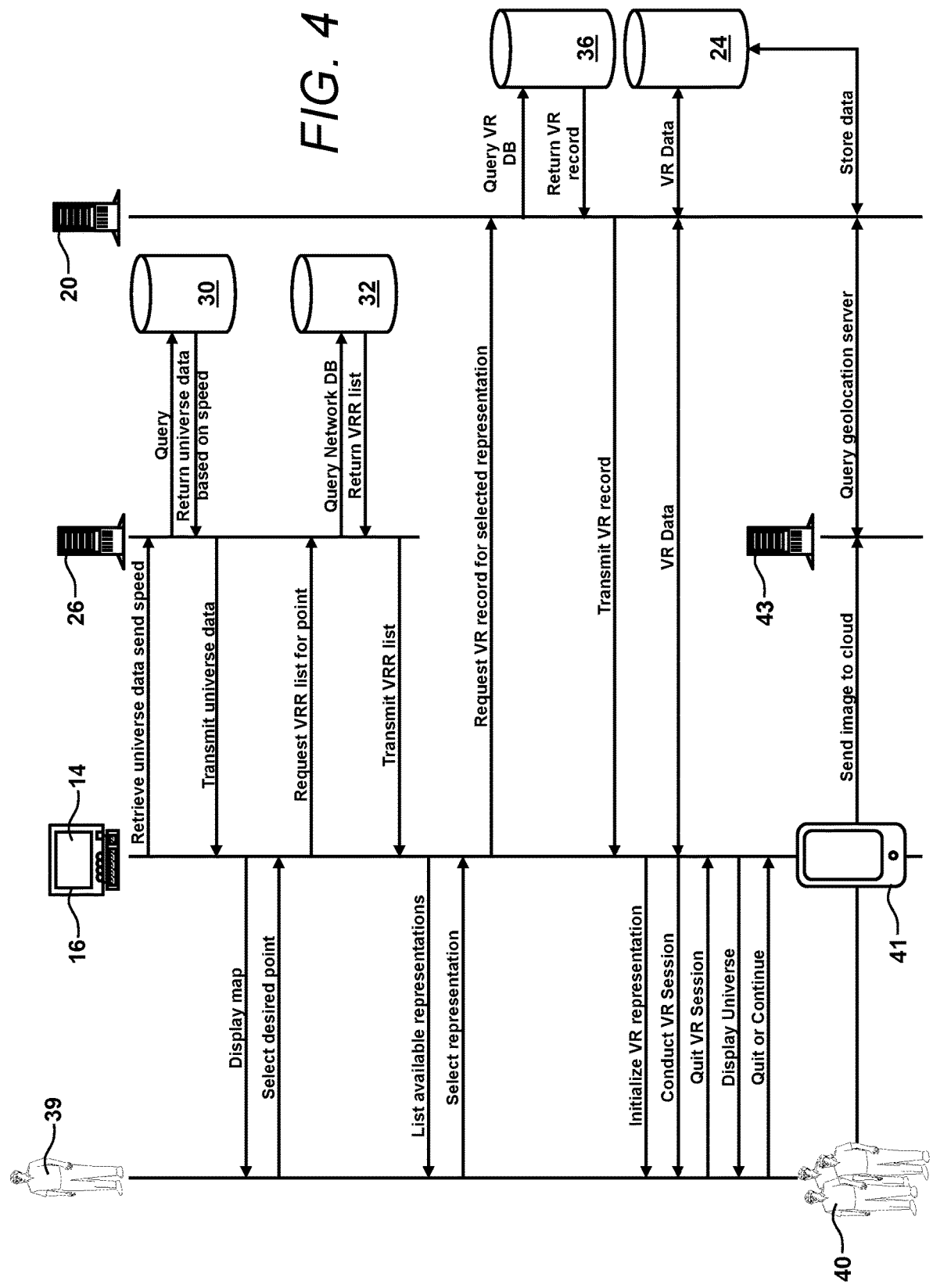

CROWD AND CLOUD ENABLED VIRTUAL REALITY DISTRIBUTED LOCATION NETWORK

CROSS REFERENCE TO RELATED APPLICATIONS

The present application is a continuation and claims the priority benefit of U.S. patent application Ser. No. 14/460,275 filed Aug. 14, 2014, which is a continuation and claims the priority benefit of U.S. patent application Ser. No. 14/147,431 filed Jan. 3, 2014, which claims priority to and the benefit of U.S. provisional patent application 61/786,581 filed Mar. 15, 2013, the disclosures of which are incorporated herein by reference.

BACKGROUND OF THE INVENTION

1. Field of Invention

The present invention relates generally to computer-generated virtual reality representations of locations. Specifically, the present invention relates to automatically using a smartphone or tablet or other computing device for imaging capability and Geo Location (GPS) capability to store, organize, and then provide access to a number of virtual reality representations via a computer network.

2. Description of the Related Art

Virtual reality (VR) models and simulates views from a location in virtual space. The visitor perceives the view from virtual space on a computer monitor or specialized display, and experiences "movement" by changing position or orientation within the virtual space. The visitor may even be "teleported" to different points in the virtual space.

Although recognized as having substantial potential, virtual reality has remained limited mainly to computer games and expensive training simulations. As explained below, virtual reality representations model a single virtual space, and authoring virtual reality representations requires specialized computer programming or graphics skills. These factors have hindered broader adoption of virtual reality.

A virtual reality representation models a single volume, area, or point within virtual space. The representation may model physical space, such as a location or region on the Earth, or may model imaginary space in a video game. The visitor can move around in the virtual space, but is limited to remaining in that virtual space.

Two authors may create virtual reality representations of the same location, or of related locations. These representations may exist on different websites, servers, or computers. There is no comprehensive way of organizing or searching these representations and offering them to the user so that they may be logically viewed together.

In particular, U.S. Pat. No. 7,298,378, Virtual Reality Universe Realized as a distributed location network, issued Nov. 20, 2007 by Hagenbach et al shows that the representations be connected together in a way that enables the visitor to experience both representations. For example, U.S. Pat. No. 7,298,378 shows if the locations modeled the same physical location, the visitor could choose which representation to experience. If the locations modeled adjacent physical locations, the visitor could experience moving from one virtual location to another. This creates a "virtual universe" made of separate virtual reality representations that can be toured by visitors.

Even if representations generated by different authors can be logically connected together in a virtual universe, there remains an additional need to simplify authoring of virtual reality representations. The programming and graphic skills required by conventional VR software makes creation of virtual reality representations a relatively complex and expensive process. The easier and faster virtual reality representations can be created, the easier and faster a rich and varied virtual universe can be created and offered to visitors.

Today, smartphones are prevalent among billions of users and almost all of them have both GPS, imaging and recording capability. Many smartphones have auto cloud storage of images and recordings as well, as a free or paid for service. These cloud storages are local and access is provided only to the user. Also, there is not representation of these images to take a "journey" that relates to the physical trip taken, that is, photos are usually grouped by time, catergories and file folders. Some smart cameras store photos by geolocation and even render these photos for selection based upon a map. However, given the tremendous amount of data taken, there is no virtual reality database that allows access, by geo location based upon a crowd source. That is, pictures are geo located and are collected by multiple authors.

There are some companies, like Google, that create a VR world like Google Earth. Google Early allows a user to travel and see pictures taken either from satellite or from images taken by Google using its automobile data collection systems. However, such systems depersonalize the experience by having a structured viewing process. In a true VR universe, many views from many authors would provide for a more rich experience.

Thus there is a need for logically connecting virtual reality representations together to form a virtual universe where images taken by users can be automatically added to the VR universe. Thereby expanding the VR universe exponentially and making the VR universe infinitely more useful. In addition to conventional virtual reality software, a simplified method of creating virtual reality presentations is needed to encourage creation of the virtual universe.

There also exists a need to create a more rich experience for VR visitors, wherein anyone can add to the VR universe.

SUMMARY OF THE CLAIMED INVENTION

The invention is a network capable of connecting virtual reality representations together to form a virtual universe. The virtual reality representations can be in a simplified virtual reality format that requires no special computer programming or graphics skills to create.

A network in accordance with the present invention includes a number of virtual reality representations, each virtual reality representation representing a location in a virtual universe and defined by VR data stored on the network at a network address. Each representation is taken from a crowd user and automatically stored by geo location based upon the GPS reading of the computing device, preferably a smartphone or tablet that took the image.

A database stores the network address and the location in the universe of each virtual reality representation. A database server provides access to the database. The database server generates a list of locations in response to a location query from a visitor, and provides the network address of the virtual reality representation of a selected location.

The visitor connects to the network using a client host adapted to communicate with the domain server. The host receives data representing the network address of the VR data server associated with a selected VR representation. The host is also adapted to communicate with the VR data server to access the VR data set defining the VR representation.

In using the network, the visitor is preferably presented with a map displaying locations in the virtual universe. Each location is associated with a virtual reality representation accessible through the network. The visitor selects a location on the map he or she desires to visit. The domain server receives the selected location and retrieves from the database the network location of the data server providing access to the selected virtual reality representation. The domain server transmits the network address of the data server to the host, and the host communicates with the data server to receive the VR data defining the virtual reality representation.

The authors of the data can enable a program running in the background of their device to automatically send any picture the author decides to the cloud for storage.

In one possible embodiment, the client host includes a monitor that displays both the map and the virtual reality presentation generated from the VR data. In other possible embodiments the virtual reality presentation can utilize specialized hardware separate from the map display.

In some embodiments of the present invention, the network stores data representing paths in the virtual universe. A path is defined by at least two different locations in the universe. When the domain server receives a message from the host requesting virtual movement from a first location to a second location, the domain server communicates the network address of the data server associated with the second location to the host. The host then communicates with that data server and transitions from the first VR presentation to the VR presentation of the second location. The visitor perceives a substantially continuous movement along the path from the first location to the second location without leaving the virtual universe.

In one embodiment, the use or visitor can also see, for any location, if there are multiple images at different times. The visitor can take a time travel journey if there are multiple images of the same location at various times.

In another embodiment, the user or visitor can see a map of a journey at a particular time, in that the some locations may or may not have images at a given time.

Paths can be defined in different ways in alternative embodiments of the network. The domain server can store predefined path definitions by storing a list of the locations defining the path. Alternatively, the domain server stores a data record for each location in the universe. The data set records the adjacent locations in the universe to define a path from each location to adjacent locations. In other alternative embodiments the path is defined in response to system events and then made available to the user.

The network preferably includes administrative software that enables new virtual reality representations to be added to the network. The virtual reality representations can be stored on existing data servers on the network, or stored on data servers that are themselves added to the network. The database is updated to reflect the new locations in the virtual universe and the network addresses of the data servers accessing the representations.

In one advantageous embodiment of the present invention, the virtual universe is divided into public and private regions. Any author can add to the network a virtual reality representation of a location in the public region of the universe. Only authorized authors can add representations in private regions of the universe.

In one embodiment, a crowd user or visitor can automatically select a photograph to be sent to the cloud for storage at the correct geo location dataset. The crowd user or visitor can make the image public or private. When the crowd user becomes a visitor, they may elect to see a public data set, but also, they are the only visitor that can see their private dataset.

In another advantageous embodiment of the present invention, the network is operated as a self-regulating virtual reality universe. The network preferably provides visitor access to a number of virtual reality representations, each authored by a different author. The domain server receives ratings from visitors to the quality of the virtual reality representations they visited, and assesses the quality of each virtual reality representation based on the ratings provided by the visitors.

Action is then take regarding a virtual reality based on the assessed quality of the virtual reality representation. The quality can be rated as a running average of visitor ratings. If the rating falls below a predetermined score, visitor access to the representation can be removed or the representation can be removed from the network. Preferably the action is taken automatically and without human intervention so that the network is self-regulating.

To simplify creation of virtual reality representations, the VR data can be stored in a simplified file format that stores digital photographs taken from a specific geographic location. An author takes a number of photographs from the location with a digital camera. The photographs are preferably in JPG format but other "digital film" formats can be used. Each photograph preferably is taken in a different viewing direction, preferably viewing north, south, east, and west. The images are uploaded to the network along with geographical data (for example, latitude and longitude) that identifies where the photographs were taken. The domain server stores the images, the viewing direction associated with each image, and geographical data in a single data file on a data server. The domain server updates its database, associating the geographical location with a virtual location in the virtual universe. The virtual representation is now accessible to visitors, and the photographs are displayed when generating the virtual reality presentation of the virtual location.

A virtual reality network in accordance with the present invention offers many advantages. A number of different virtual reality representations are made available to visitors through a single, centrally accessible domain server. The domain server enables visitors to experience virtual reality representations created by different authors, and to tour a virtual universe created by logically organizing and connecting the separate representations.

Authors can easily add new virtual reality representations to the network, enabling visitors to experience a virtual reality universe that grows richer and richer with time. With the simplified VR file format, persons may share with others their travels to places around the world, or may easily create their own virtual universe for business or private use.

Other objects and features of the present invention will become apparent as the description proceeds, especially when taken in conjunction with the accompanying eight drawing sheets illustrating an embodiment of the invention.

BRIEF DESCRIPTION OF THE DRAWINGS

FIG. 2 is a schematic view of a virtual reality representation record used in the network shown in FIG. 1;

FIG. 3A is a schematic view of a virtual reality record used in the network shown in FIG. 1;

FIG. 3B is a schematic view of virtual reality records of a same geo location stored by time.

FIG. 4 is a sequence diagram illustrating a visitor utilizing a client host communicating with the network shown in FIG. 1 to view a location in the virtual universe;

DETAILED DESCRIPTION

Embodiments of the present invention comprise a system and method for enabling a visitor to access virtual reality (VR) representations authored by different authors of locations in a virtual universe via a computer network. The system and method include a memory for storing a plurality of VR data sets, each VR data set defining a VR representation of a location and comprising multiple datasets of images at a same location at a plurality of times, each VR data set independently authored by a respective author different from the other authors. The memory also stores a VR data set from the author of the VR data set. The system also includes one or more VR data servers adapted to access and transmit the VR data sets, each VR data set associated with a VR data server for access to the VR data set. A domain server is also includes to adapt to access and transmit domain data that includes the location within the universe of each VR representation and the network address of the VR data server associated with the VR representation. A client host is adapted to communicate with the domain server to receive domain data representing the network address of the VR data server associated with a selected VR representation, the client host further adapted to communicate with that VR data server to access the VR data set defining the VR representation without leaving the virtual universe.

Users or visitors may use any number of different electronic computing client devices, which can include, but is not limited to, general purpose computers, mobile phones, smartphones, personal digital assistants (PDAs), portable computing devices (e.g., laptop, netbook, tablets), desktop computing devices, handheld computing device, or any other type of computing device capable of communicating over a communication network. Such devices are preferably configured to access data from other storage media, such as, but not limited to memory cards or disk drives as may be appropriate in the case of downloaded services. Such devices preferably include standard hardware computing components such as, but not limited to network and media interfaces, non-transitory computer-readable storage (memory), and processors for executing instructions that may be stored in memory.

Figure 1:
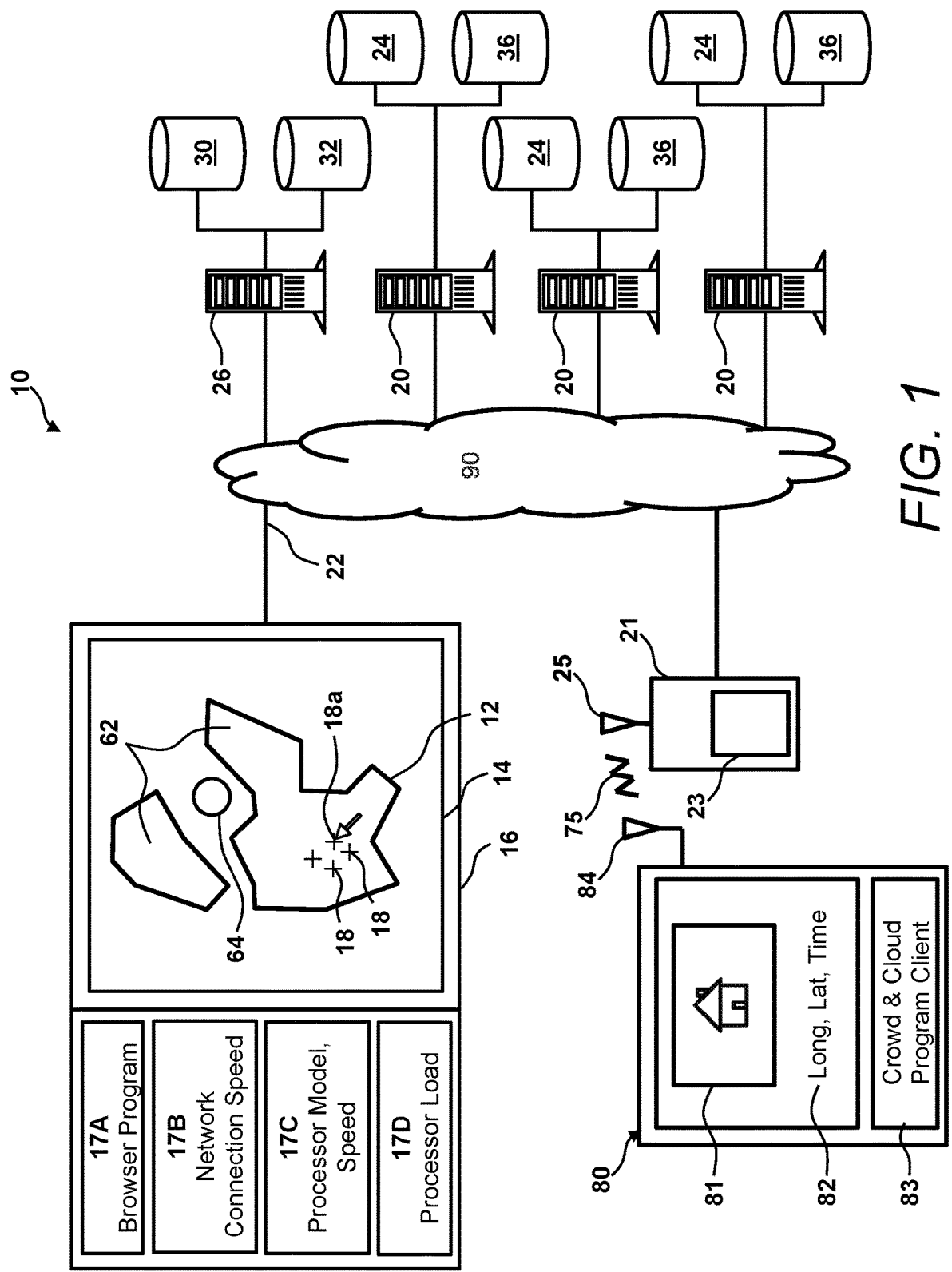
FIG. 1 is a schematic view of a virtual reality universe realized as a distributed location network in accordance with the present invention.

FIG. 1 illustrates a distributed location network 10 in accordance with the present invention.

The network 10 enables a visitor to visit and explore a virtual universe. FIG. 1 illustrates a map 12 of the virtual universe displayed on a visitor's computer monitor by a software program or virtual reality browser (VR browser) 14 running on a visitor's computer 16 connected as a network client. The universe can model a real or tangible space, such as the surface of the Earth, with the universe representing real or tangible locations in physical space. Alternatively, the universe can model an imaginary space, such as L. Frank Baum's Oz or a stick model of a protein molecule, with the universe representing imaginary locations in nonphysical space.

The network 10 is preferably a local, proprietary network (e.g., an intranet) and/or is alternatively a part of a larger wide-area network (e.g., the cloud). The network 10 can be a local area network (LAN), which is communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provide.

The visitor explores the universe by selecting and viewing virtual reality presentations of virtual locations or points 18 on the map 12. Each point 18 represents a location in the universe that has at least one virtual reality representation available for a visitor to access and experience. A point 18 can model a point, area or volume in the virtual universe, and a visitor may be capable of moving about the area or volume if the virtual reality presentation enables it.

The VR browser 14 retrieves the data for the virtual reality representations from virtual reality data servers (VR data servers) 20. VR data servers 20 are connected to the browser 14 by network connections 22. The network connections 22 may be through a Local Area Network (LAN) or a global network such as the Internet. VR data servers 20 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Each VR data server 20 provides access to VR data 24 for a virtual reality representation of the selected point 18. Data can be stored in conventional virtual reality file formats such as QUICKTIME, X3D, VRML, and the like, or can be stored as separate digital image files. VR data 24 can be stored on the VR data server 20 or stored on additional network data servers (not shown) distributed through the network 10.

The entire network 10, including the network client 16 and the servers 20 and 26, may also be hosted on a single computer if a distributed network is not required.

A point 18 may have a number of different virtual reality representations served by a number of different VR data servers 20. These representations may be stored in different file formats, may represent the point in different seasons of the year or in different historical eras, or may provide an alternative or augmented user interface or sensory experience. Of course, a particular data server 20 could serve a number of virtual reality representations of a point 18 or different points 18.

A domain server 26 hosts a universe database 30 for displaying the map 12 and the points 18 on the map 12. The database 30 preferably includes graphic files, image files, and other data for generating and displaying the map 12. The universe database 30 may also include the network addresses or network paths to the VR files associated with the virtual reality representations.

The domain server 26 also maintains a network database 32 that stores information about each point 18 and the network addresses of the one or more VR data servers 20 that provide access to VR representations of the point 18.

The network database 32 holds a number of virtual reality representation records (VRR records) 34.

Smartphone or tablet 80 has captured image 81 along with data 82 on the geo location (time, longitude, latitude, height) and includes "crowd-cloud client side program" 83 and antenna 84.

The smartphone uses "crowd-cloud client side program" to determine if the image is to be sent to the system and if so, is sent through wireless connection 75 to wireless antenna 25 of server 21. Server 21 has "crowd-cloud server side program" that determines which of servers 20 and 26 are connected to cloud 90 and which of servers 20 and 26 are used to store the images by geo location.

FIG. 2 illustrates a typical VRR record 34. The VRR record 34 is a data structure that provides information enabling the VR browser 14 to locate the VR data server 20 providing access to a specific VR representation. A VRR record 34 includes the location of the point 18 and the network address of the VR data server 20 associated with the VR representation of the point 18.

The VRR record 34 preferably also includes metadata providing additional information about the point 18, the associated VR data server 20, and the virtual reality representation of the point 18. Metadata can include the author, VR file format, or a description of the VR representation. Other metadata can include digital rights management (DRM) information, initial orientation or direction of the default opening view of the virtual reality representation, or the like. Also, metadata can include geo location, such as longitude and latitude and height, as well as time of day when the image was taken.

Each VR data server 20 maintains a local database 36 that records the location or locations of the VR data 24 accessed through the VR data server 20 (see FIG. 1). The local database 36 holds a virtual reality record (VR record) 38 for each representation accessed through the VR data server 20.

FIG. 3A illustrates a typical VR record 38. The VR record 38 is a data structure that includes the location of the point 18, the location of the VR data 24 for the representation of the point, and metadata containing further information about the VR data 24. For example, such metadata may include the author and digital rights management (DRM) information, VR data format, or descriptive information about the VR representation. Also, metadata can include geo location, such as longitude and latitude and height, as well as time of day when the image was taken.

The universe database 30, the network database 32, or a local database 36 can be realized as a single-file relational database, object database, or hierarchal XML database. Alternatively, a database 30, 32, 36 can be realized as a number of separate data files, wherein each data record is stored in a respective data file. The data file can be in structured text file format, XML format, or other conventional data format. The selection of database schema and format is based on conventional software engineering considerations, including the network architecture, the network load, and available software.

FIG. 3B shows a time continuum 39 with images 39.6 taken at substantially the same geo location as image 39.5 at various times 39.7. In this example, you can see images saved in the past and also see images saved at the same time. Each line in time continuum 39 represents any of images 39.6.

FIG. 4 illustrates a first user session wherein a visitor 39 explores the virtual universe point-by-point. For clarity only one visitor is shown connected to the network 10, but it should be understood that a number of visitors can simultaneously explore the universe.

The VR browser 14 retrieves the map data 30 from the domain server 26 and begins the user session by displaying the map 12 shown in FIG. 1. The map 12 displays the points 18, and the user interface of the VR browser 14 enables the visitor 39 to select which point 18 and the representation of the selected point 18 he or she would like to experience.

It should be understood that the universe database 30 may include or enable generation of a number of different maps representing different regions or sub-regions of the universe. The VR browser 14 may simultaneously or sequentially display different maps during a user session. For example, the visitor is initially presented with a "master map" or model of the entire universe. If the virtual universe is sufficiently extensive, the user interface of the VR browser 14 enables users to "drill down" and select more detailed maps or models of sub-regions (for example, maps representing a continent, a country, a city, and then a city block) to select a desired point 18.

Map 12 should therefore be understood to represent all possible maps the VR browser 14 may display as part of its user interface. Maps may be representations of one-dimensional, two-dimensional, three-dimensional, or n-dimensional space as is appropriate for the virtual universe such maps represent.

The map 12 may also display additional information that assists the visitor in selecting a point or a VR representation of the point. For example, the map might indicate points of historical interest or the number and types of virtual reality representations available for each point.

In the illustrated embodiment, the visitor selects a desired point 18a from the map 12 by clicking the mouse (see FIG. 1). The browser 14 determines the location of the selected point 18a on the map and requests a list 40 of VRR records 34 associated with that point from the domain server 26 (see FIG. 2).

The domain server 26 queries the network database 32 for the list of VRR records of points at or proximate to the selected point 18a. The domain server 26 returns the VRR list 40 to the VR browser 14. The VR browser 14 generates a list of available VR representations from the VRR list 40, and displays the list for the selected point 18a.

The display list can include information from the metadata to assist the visitor in selecting a VR representation to experience. For example, the VR browser 14 might display an icon for each representation indicating some characteristic of the representation (such as season of the year, its VR file format, or quality moderation value (discussed in further detail below)).

The visitor selects from the display list the desired virtual reality representation to experience. If there is only one representation associated with the selected point, the steps of displaying and selecting from the list can be eliminated.

The VR browser 14 uses the VRR record 34 associated with the selected representation to look up the network address of the VR data server 20 providing access to the virtual representation. The VR browser 14 requests the VR record 38 for the selected representation from the VR data server 20. The VR browser 14 uses the returned VR record 38 to fetch the VR data file 24 and initialize a virtual reality presentation that will be perceived and experienced by the visitor 39. For example, the VR browser 14 could start one helper application to display a QUICKTIME presentation and another helper application to display a VRML presentation.

In the illustrated embodiment, the VR browser 14 displays the map 12 in a first window and the virtual reality presentation in a second window (discussed in greater detail later). In other embodiments, virtual reality presentations could be displayed independently of the VR browser 14 through more specialized or augmented VR hardware, such as a headset.

During the VR presentation, the VR browser 14 receives input from the visitor and communicates with the VR data server 20 to fetch the VR data 36. The visitor can change the point of view and move about the presentation as permitted by the virtual reality representation being experienced. When the visitor ends the VR presentation, the window displaying the VR presentation closes or goes blank. The visitor 39 can then select a new point 18 or quit the application.

In addition to exploring selected points 18, the network 10 enables the visitor 39 to explore paths through the universe. See, for example, path 42 shown in FIG. 5. A path is defined as extending along a set of points or extending between start and end points in the universe. The network 10 supports multiple types of paths as will be described in further detail below.

A visitor sequentially experiences virtual reality presentations of the points 18 on the path. The VR browser 14 automatically moves from displaying one VR presentation to the next in response to visitor input indicating movement along the path. This provides the visitor with the perception of walking through or being "immersed" in the universe. If the points 18 are sufficiently close together, the visitor will essentially perceive continuous or seamless movement through the virtual universe.

Path 42 represents a pre-defined path. A pre-defined path is defined prior to the user session and may, for example, represent a virtual river, highway, or historical trail through the universe. Pre-defined paths are preferably defined in the universe database 30 and represented on the map 12 for selection by the visitor 39.

FIG. 4. also shows crowd person 40, using his smartphone or smart tablet 41, taking a picture (with geo location and time) and wirelessly sending it to wireless server 43. Wireless server 43 interprets the geo location and quarries servers to find the correct database 24. Database 24 stores data related to this geo location. Database 24 stores that data and sends a verification back through the system letting the crowd user know the data was stored.

Figure 5:
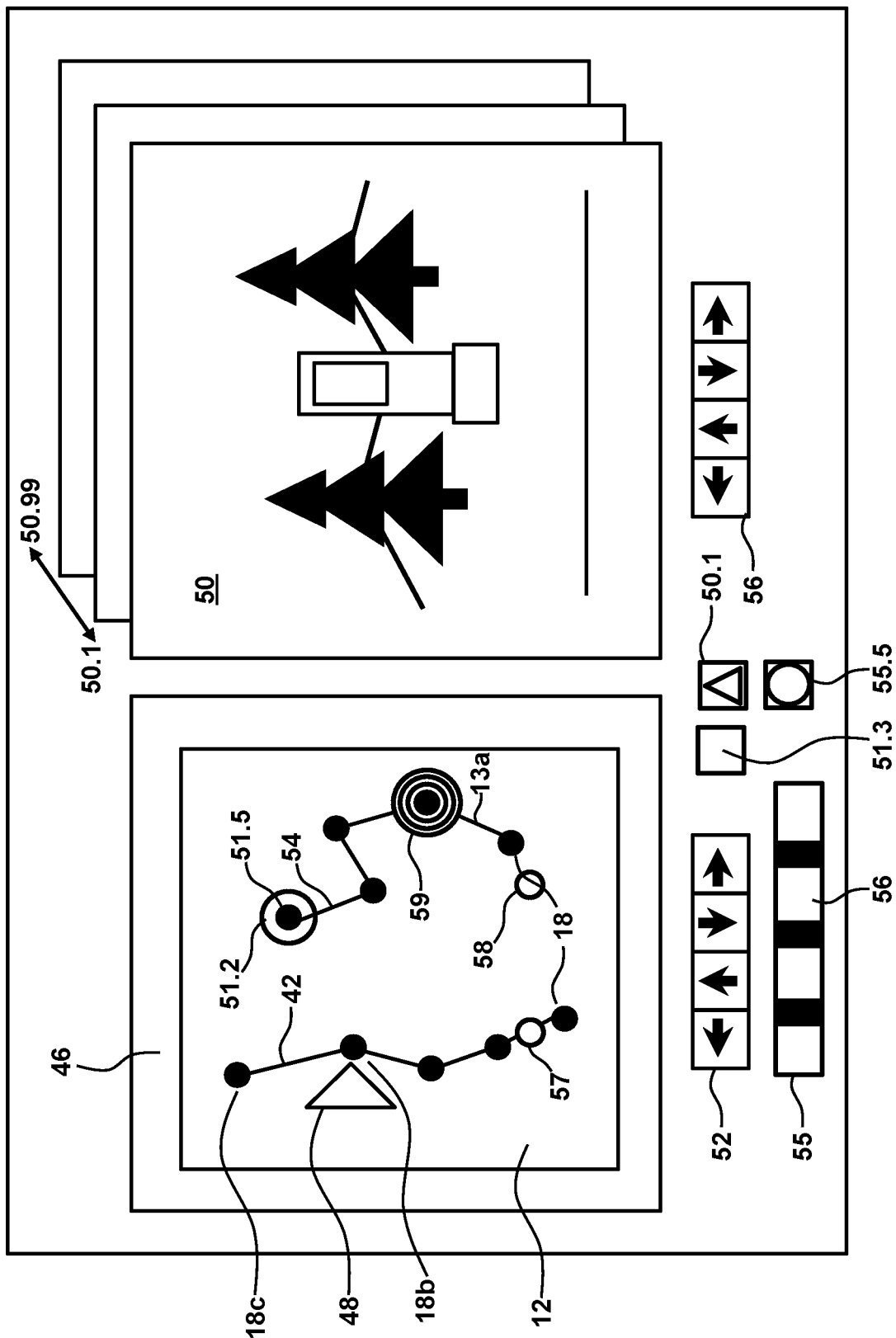
FIG. 5 is a view of the client host display displaying a map of the universe and a virtual reality presentation of a location in the virtual universe.

FIG. 5 illustrates the VR browser 14 with a first display window 46 and a second display window 50. Display window 46 displays the map 12 at a given time, the path 42, and the points 18 along the path 42 as shown. The second window 50 displays the virtual reality presentation of the active, or currently visited, point 18*b*.

When displaying a virtual reality presentation of a point 18, the VR browser 14 preferably displays an icon 48 indicating the active point 18. The illustrated icon 48 is an arrow that also indicates the approximate direction of the current line of view of the virtual reality presentation shown in the second window 50. Icon 48 is shown indicating that point 18*b* is the active point and that the direction of the current line of view is west.

Navigation widgets 52 associated with the first window 46 enable the visitor to move along the path 42 or to move to a different path (such as a second path 54). Navigation widgets 56 associated with the second window 50 enable the visitor to change the line of view of the VR presentation in the second window 50. Widgets 52 and 56 can be combined into a single control if desired, and alternative known interface controls (including the mouse) or other interface widgets may replace or be used with the widgets 52, 56.

FIG. 5 also shows time bar 55, with dates and times selectable by time marker 56. Only those images available in a range of the time marker are shown on map 12. When the time is advanced, a new location can be shown such as picture 51 of time 2 or new location of picture 52 at time 3. Also shown for a particular location 59, are multiple images at various times. In this way, the user can select time travel icon 55.5 and create a time travel display of the same location, with pictures 50, 50.1, 50.99 showing images of the same location at various times. Thus, a visitor can take a time tour thru the virtual world. Also shown is location button 50.1 where the visitor can switch back to location journey mode.

Also shown in FIG. 5 is private key icon 51.3. When private key icon 51.3 is selected, public location 51.5 shows private overlay location 51.2. In this way, the visitor, who may have been a contributor to any location, would have the ability to see their own private non-public cloud selection. In this way, three modes are available for viewing, public only, private only and public/private combined.

Figure 6:
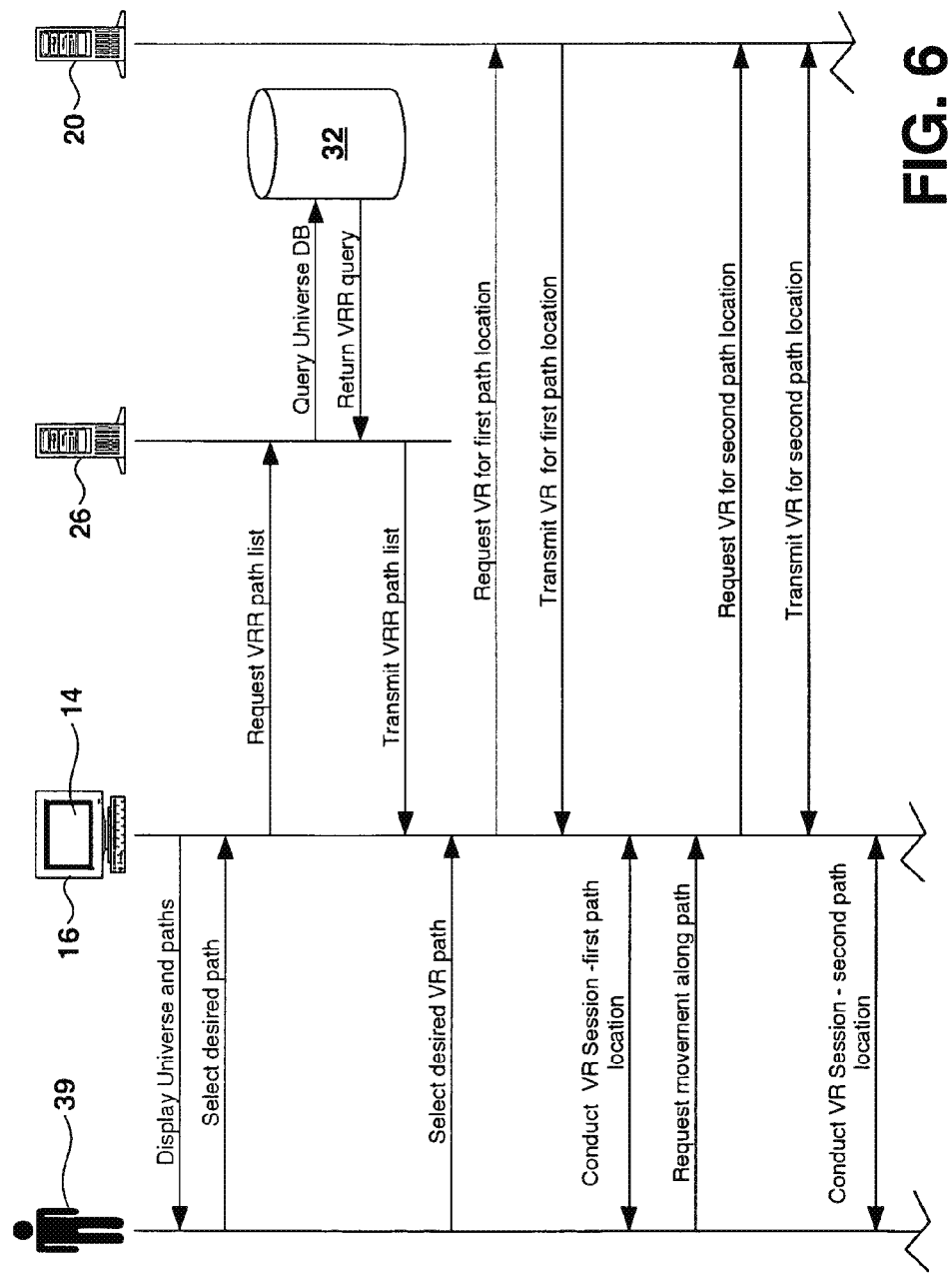
FIG. 6 is a sequence diagram similar to FIG. 4 illustrating a visitor moving along a path in the virtual universe.

FIG. 6 illustrates a second user session in which the visitor moves along and explores the path 42 (the database 36 and VR data 24 are omitted from the drawing). The VR browser 14 retrieves the map and path data from the universe database 30 and displays the map 12 as shown in FIG. 5.

The visitor selects the desired path 42, and the VR browser 14 obtains the VRR record list 40 for the points 18 on the path 42 from the domain server 26. For simplicity, it is assumed that each point 18 on the path 42 has only one virtual reality representation; so each VRR record 34 is associated with a single point 18 on the path 42.

The VR browser 14 uses the VRR record 34 associated with the path's starting point 18*c* to look up the network address of the appropriate VR data server 20 and retrieves the VR record 38 from that server 20. The VR record data is used to initialize and display the virtual reality presentation of the first, or starting point 18*c* (see FIG. 5). Widgets 56 control the line of view of the virtual reality presentation as described.

Widgets 52 move the visitor to the next, or second point on the path 42. The VR browser 14 uses the VRR record 34 associated with the next point to retrieve VR data for the next point. If the points 18 along the path 42 are sufficiently close, the transition from point to point appears to the visitor as a continuous movement along the path.

In moving from the virtual reality representation of one point to another, the VR browser 14 may also maintain (as closely as possible) the same line of view to maintain the appearance of continuous movement. For example, if the visitor is looking south and moves to the next point, the initial line of view for the next point is also viewing south. In alternative embodiments, however, the VR browser 14 can initialize each virtual reality presentation with a pre-determined or default line of view.

Figure 7B:
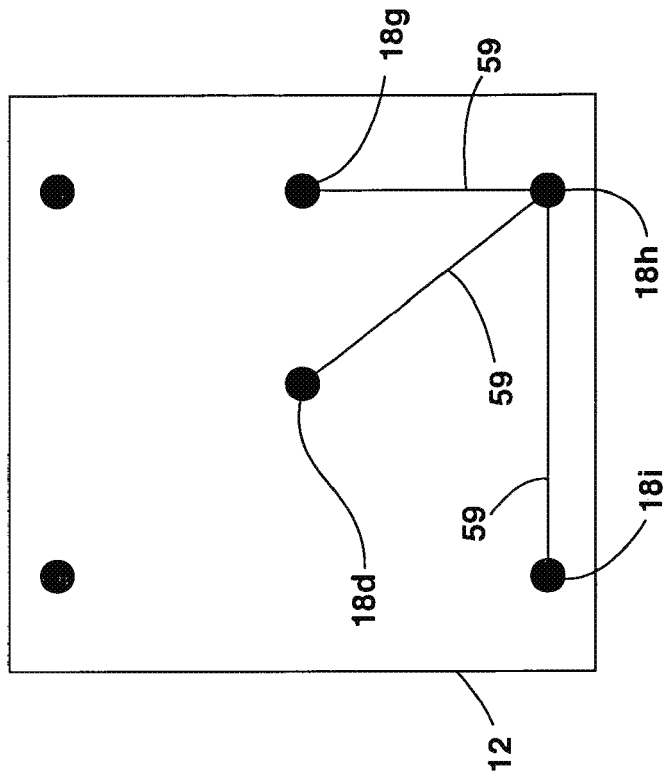
FIGS. 7a and 7b represent paths in the virtual universe extending between adjacent locations in the universe.
Figure 7A:
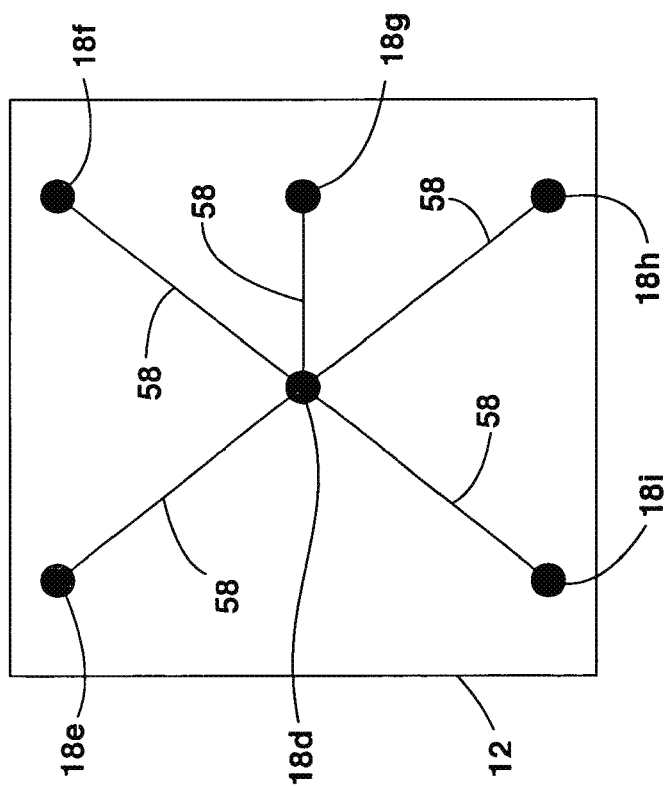

A second type of path preferably supported by the network 10 is a connection path. A connection path is a dynamic path generated from an active point 18 to adjacent points 18 during the user session. FIG. 7a illustrates the map 12 displaying connection paths 58 extending between an active point 18d and adjacent points 18e-18i. Connection paths 58 connect two adjacent or neighboring points 18, enabling the visitor to pick and choose his or her own route through the universe.

The connection paths 58 typically provide multiple routes between points. For example, the visitor can move from point 18d to point 18h directly, or can move first to point 18g and then to point 18h. FIG. 7b illustrates the connection paths 59 when the visitor reaches point 18h. The paths 59 start from point 18h and end at points 18d, 18g, and 18i.

The VRR record(s) 34 for each point 18 preferably includes a connection data set (see FIG. 2) that lists adjacent points 18. For example, the connection data set for point 18d (shown in FIG. 7a) includes points 18e-18i and the direction to each point. This enables the VR browser 14 to display the connection paths 58 available to the visitor; the VR browser 14 can also iteratively retrieve the VRR records of adjacent points to display a network of available paths on the map 12. The connection data set also allows the VR browser 14 to efficiently respond and display the next virtual reality presentation after receiving a visitor request to move in a given direction from active point 18d.

The domain server 26 generates the connection data set when a new point 18 is added to the network. The adjacent points 18 are retrieved from the universe database 30 to generate the connection data set for the new point 18.

Figure 8:
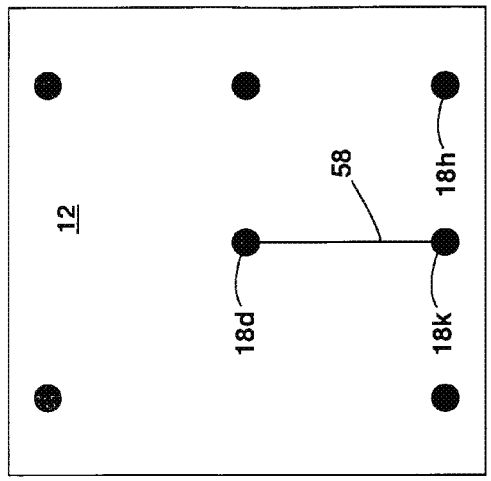
FIGS. 8-10 illustrate other paths in the virtual universe.
Figure 9:
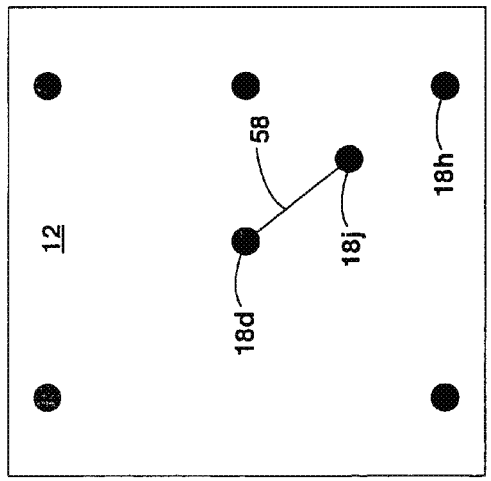

The domain server 26 also modifies the connection data set of adjacent points 18 as illustrated in FIGS. 8 and 9. The maps 12 in FIGS. 8 and 9 are otherwise identical to the map 12 in FIG. 7a, but include a later-added point 18j or 18k, respectively. In FIG. 8, point 18j is inserted between points 18d and 18h. Point 18j is now adjacent to point 18d instead of point 18h. The connection data set associated with point 18d is modified to remove point 18h and to insert point 18j for the connection path 58 extending between points 18d and 18j. In FIG. 9, point 18k is an additional point adjacent to point 18d. Point 18k is added to the data connection set associated with point 18d for the connection path 58 extending between points 18d and 18k.

A visitor can also preferably edit the connection data set for a point 18 to add or subtract connection paths extending from the point. The visitor can add a remote point 18 to the data set, creating a connection path to that remote point. A point can be removed from the data set, eliminating a connection path. The modified data set can be stored on the visitor's machine 16 for use only by the visitor's browser 14, or the modifications can be saved in the network database 32 to be made available to all visitors.

A third type of path supported by the network 10 is the event path. An event path is a dynamic path generated by the network in response to an event or visitor query. For example, the visitor 39 may request the path from his or her current location to another location in the universe. The VR browser 14 queries the universe database 30 and displays the points 18 along the path on the map 12.

Figure 10:
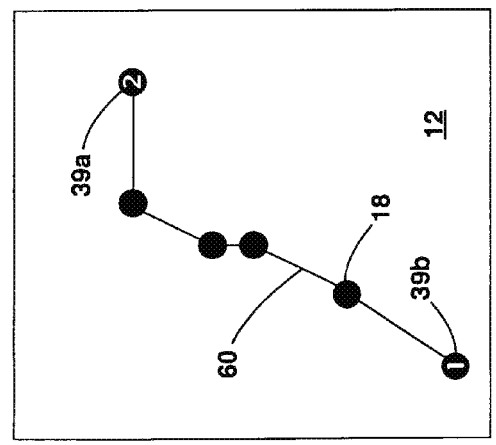

FIG. 10 illustrates an event path 60 generated by an event. The domain server 26 maintains a list of active visitors on the network 10 and the current location of each visitor in the universe. The map 12 displays the positions of all the users 39 and the path to each user. For clarity only two active visitors 39a, 39b and one path 60 between them are shown in FIG. 10. Paths 60 are automatically updated as visitors move about in the universe and as visitors join and leave the network.

A fourth type of path supported by the network is the visitor-defined path. Path 54 (see FIG. 5) represents a visitor-defined path. The visitor defines the end points and the points 18 of the path 54. The path can be created, for example, by inputting a list of the points 18 defining the path or by having the VR browser 14 maintain and store a history of the points 18 visited by the visitor in prior visits.

The definition of the visitor-defined path 54 may be stored on the visitor's machine 16 for use only by the visitor 39. Alternatively, the path definition is stored in the universe database 30 and made available to all network visitors. As described above, the domain server 26 provides a single point of access for the VR browser 14 to initiate a user session and display a map of available points 18 in the universe. This enables new points 18 to be added to the universe and new virtual reality representations of new or existing points 18 to be made available to all VR browsers 14 on the network 10 by updating the domain server databases 30 and 32.

An author creating a virtual reality representation for a new or existing point 18 stores the data on his or her own VR data server 20 and then connects the VR data server to the network 10. The author remotely invokes an administrative program on the domain server 26 that adds the location to the universe database 30 and adds a new VRR record 34 to the network database 32. The new VRR record 34 includes the location of the new point 18 and the network address of the associated VR data server 20. The VR browser 14 automatically generates an up-to-date map 12 when it retrieves the map data from the universe database 30.

If desired, the client machine 16 can cache VR data 34 as well as records from the databases 30, 32, and 36 for improved performance. The VR browser 14 uses the local data cache to display the map and to retrieve VR data from the network 10. However, the data cache should be refreshed regularly or at the visitor's command to prevent stale data. Alternatively, the database records can include a "Time to Live" field for automatic updating of the data caches.

To facilitate creation of VR representations of points 18, the universe is preferably divided into a public region and a private region. Authors are free to add virtual reality representations of any point in the public region. Only authorized authors can add virtual representations of private regions.

To illustrate the concept of public and private regions in more concrete terms, the map 12 is a virtual representation of the Gettysburg National Military Park 62 and the adjacent borough of Gettysburg, Pa. 64. See FIG. 1; the borough of Gettysburg is represented schematically as a circular area. The Military Park 62 is a public region of the universe and the borough of Gettysburg 64 is a private region of the universe.

Tourists or Civil War buffs can author a virtual reality representation for a new point 18 in the Military Park 62 or author an additional virtual reality representation for an existing point 18. The author can provide visitor access to the representation through a publicly or privately available VR data server 20. The author updates the domain server databases 30, 32 through the administrative software as previously described and updates the local database 36 and stores the VR data 24 on the data server 20. The new point and its representation are now available to all visitors.

Over time, the number of points in the universe having virtual reality representations increases and the number of representations for a given point increases. This enables users to select points and view presentations that provide them with a rich and varied virtual visit to the virtual Military Park 62.

To further encourage the creation and selection of high-quality virtual presentations, each representation of a public point 18 is preferably assigned a quality moderation value. A quality moderation value represents the quality of the representation and assists visitors in selecting which representations to view. The quality moderation value is preferably stored in the representation's VRR record 34 (see FIG. 2) and is displayed on the map 12.

For example, a representation can be assigned a quality moderation value between 0 and 10, where 0 represents a low quality representation and 10 represents a high quality representation. A visitor can rate the quality of the representation after experiencing the virtual reality presentation. A running average of visitors' ratings is stored as the representation's quality moderation value. This mechanism enables the network 10 to be self-moderating in that representations whose quality falls below a minimum value can be automatically removed from the network or not listed for selection.

Virtual reality representations of points within Gettysburg borough 64, however, are limited to authorized authors. Examples of such authors may include owners of commercial establishments who wish to control the content of the virtual reality representation of their store or business. A private representation may be hosted on a VR data server 20 whose access is controlled by the author and may or may not be assigned a quality moderation value.

Virtual reality representations of public points are preferably created in a simple, standardized format to encourage those without technical or computer expertise to contribute virtual reality representations to the network 10.

Figure 11:
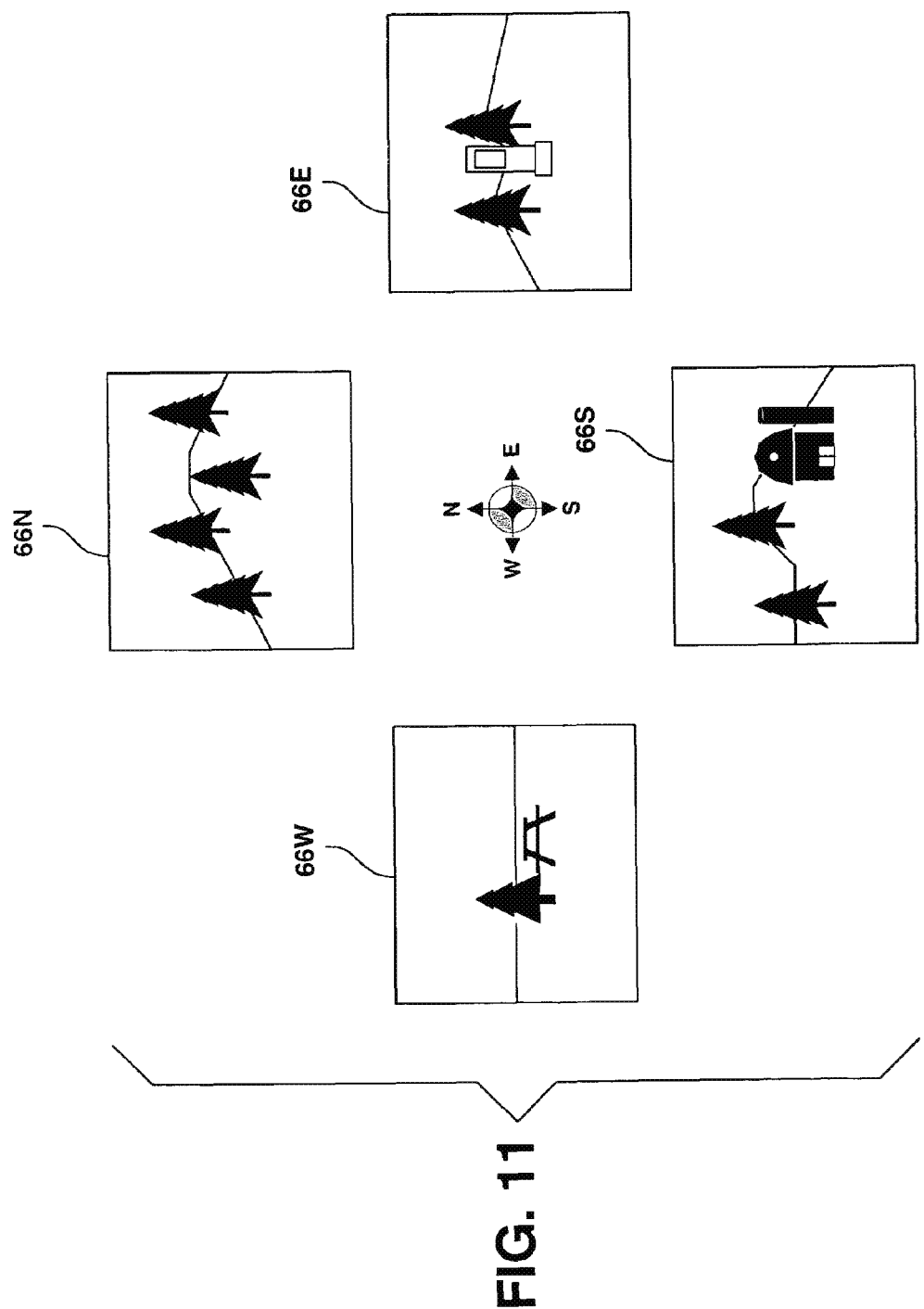
FIG. 11 represents photographs that define a simplified virtual reality representation of a physical location modeled in the virtual universe.

FIG. 11 illustrates a preferred, simplified virtual reality format. Four images 66 are taken with a digital camera from a point, each photograph having a line of view facing north, south, east, and west, respectively. The administrative program uploads the four image files and presents an on-line form requesting the location of the point and associated metadata. The administrative program stores the image files as VR data 24 on a VR data server 20, updates the universe database 30, adds the appropriate VRR record to the network database 32, and adds the appropriate VR record to the local database 36.

Because the illustrated public region 62 represents an area of the Earth, the latitude and longitude of the corresponding physical location of an actual point on the Earth's surface provides a convenient way of identifying the location of a point 18 on the map 12. The administrative program requests the latitude and longitude of the point, which can be obtained, for example, by a GPS reading when the digital photographs are taken.

It is understood that other kinds of metadata, data fields, data keys, or data formats can be used for or stored in the databases 30, 32, and 36 and that other VR data 24 can be stored in other file formats. The data can be distributed on other servers on the network 10. But the VR browser 14 preferably accesses the network 10 initially through the single domain server 26 regardless of how the data itself is distributed throughout the network 10.

It is contemplated that embodiments of the virtual reality network 10 will be customized for particular industries or visitors. For example, a real estate network would host virtual reality representations of houses available for sale. The seller's real estate agent takes photographs of each room in a house and uploads them to the real estate network, along with the floor plan and other metadata. A buyer's real estate agent selects the house to visit, and the VR browser displays the floor plan and the paths through the house. The visitor moves along the paths in the house, in effect taking a virtual reality tour through each room in the house.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What is claimed is:

1. A method for accessing augmented representations, the method comprising:

storing a plurality of data sets in memory, each data set defining an augmented representation of a geographical location, wherein each data set includes at least one of: data that is assigned a privacy level corresponding to a public mode or data that is assigned a privacy level corresponding to a private mode;

associating one or more data servers with each of the data sets stored in memory, wherein the one or more data servers access and transmit the data sets;

receiving input from a computing device that selects a geographical location and input that selects a privacy level available via an icon, wherein the selected privacy level is a combined public and private mode;

providing domain data regarding the selected geographical location and the selected privacy level, the domain data including a network address of the one or more data servers associated with the data set defining the augmented representation of the selected geographical location and including data corresponding to the selected privacy level; and sharing the data set defining the augmented representation of the selected geographical location and including data corresponding to the selected privacy level with the computing device, wherein the computing device generates a display of the augmented representation of the selected geographical location based on the data set, wherein the display includes the data that is assigned the privacy level corresponding to the public mode and the data that is assigned the privacy level corresponding to the private mode, and wherein the augmented representation is updatable based on new input selecting a different privacy level via the icon.

2. The method of claim 1, wherein the plurality of data sets define the augmented representation of a same geographical location at different times.

3. The method of claim 1, wherein the plurality of data sets define the augmented representation of a same geographical location and are authored by different users.

4. The method of claim 1, wherein each of the plurality of data sets is stored in association with a respective geographic location.

5. The method of claim 1, wherein the augmented representation includes the icon selectable to switch between different available privacy levels.

6. The method of claim 1, wherein the augmented representation of the selected geographical location includes one or more points of interest.

7. The method of claim 6, further comprising:
generating a map of the selected geographical location that includes the one or more points of interest; and
receiving a selection of the one or more points of interest, wherein the generated augmented representation displays the selected points of interest.

8. The method of claim 1, further comprising generating a path that extends along a set of points of interest, wherein generating the augmented representation is based on travel between the set of points of interest along the path.

9. A system for accessing augmented representations, the system comprising:
memory that stores a plurality of data sets in memory, each data set defining an augmented representation of a geographical location, wherein each data set includes at least one of: data that is assigned a privacy level corresponding to a public mode or data that is assigned a privacy level corresponding to a private mode;
one or more data servers associated with each of the data sets stored in memory, wherein the one or more data servers access and transmit the data sets;
a domain server that provides domain data regarding a selected geographical location, the domain data including a network address of the one or more data servers associated with the data set defining the augmented representation of the selected geographical location; and
a client host that:
transmits input from a computing device that selects a geographical location and input that selects a privacy level available via an icon, wherein the selected privacy level is a combined public and private mode;
receives the shared data set defining the augmented representation of the selected geographical location and including data corresponding to the selected privacy level; and
generates a display of the augmented representation of the selected geographical location based on the data set, wherein the display includes the data that is assigned the privacy level corresponding to the public mode and the data that is assigned the privacy level corresponding to the private mode, and wherein the augmented representation is updatable based on new input selecting a different privacy level via the icon.

10. The system of claim 9, wherein multiple data sets from the plurality of data sets stored in memory define the augmented representation of a same geographical location but at different times.

11. The system of claim 9, wherein multiple data sets from the plurality of data sets stored in memory define the augmented representation of a same geographical location but are authored by different users.

12. The system of claim 9, wherein the plurality of data sets are organized by geographical location when stored in memory.

13. The system of claim 9, wherein the augmented representation includes the icon selectable to switch between different available privacy levels.

14. The system of claim 9, wherein the augmented representation of the selected geographical location include one or more points of interest.

15. The system of claim 9, wherein the client host further:
generates a map of the selected geographical location that displays one or more points of interest; and
receives user selection of the one or more points of interest, wherein the user selection indicates the one or more points of interest that a user would like to view within the augmented representation of the selected geographical location.

16. The system of claim 9, wherein the client host further generates a path that extends along a set of points of interest, wherein a user travels between the set of points of interest within the augmented representation along the path.

17. A non-transitory computer-readable storage medium having embodied thereon a program executable by a processor to perform a method for accessing augmented representations, the method comprising:
storing a plurality of data sets in memory, each data set defining an augmented representation of a geographical location, wherein each data set includes at least one of: data that is assigned a privacy level corresponding to a public mode or data that is assigned a private mode;
associating one or more data servers with each of the data sets stored in memory, wherein the one or more data servers access and transmit the data sets;
receiving input from a computing device that selects a geographical location and input that selects a privacy level available via an icon, wherein the selected privacy level is a combined public and private mode;
providing domain data regarding the selected geographical location and the selected privacy level, the domain data including a network address of the one or more data servers associated with the data set defining the augmented representation of the selected geographical location and including data corresponding to the selected privacy level; and
sharing the data set defining the augmented representation of the selected geographical location and including data corresponding to the selected privacy level with the computing device, wherein the computing device generates a display of the augmented representation of the selected geographical location based on the data set, wherein the display includes the data that is assigned the privacy level corresponding to the public mode and the data that is assigned the privacy level corresponding to the private mode, and wherein the augmented representation is updatable based on new input selecting a different privacy level via the icon.

18. The method of claim 1, wherein the new input selects the private mode, and wherein the display of the augmented representation is updated to include only the data that is assigned the privacy level corresponding to the private mode.

19. The method of claim 1, wherein the new input selects the public mode, and wherein the display of the augmented representation is updated to include only the data that is assigned the privacy level corresponding to the public mode.

\* \* \* \* \*